E. A. REEVES.
PISTON.
APPLICATION FILED OCT. 28, 1912.
1,084,755.
Patented Jan. 20, 1914.
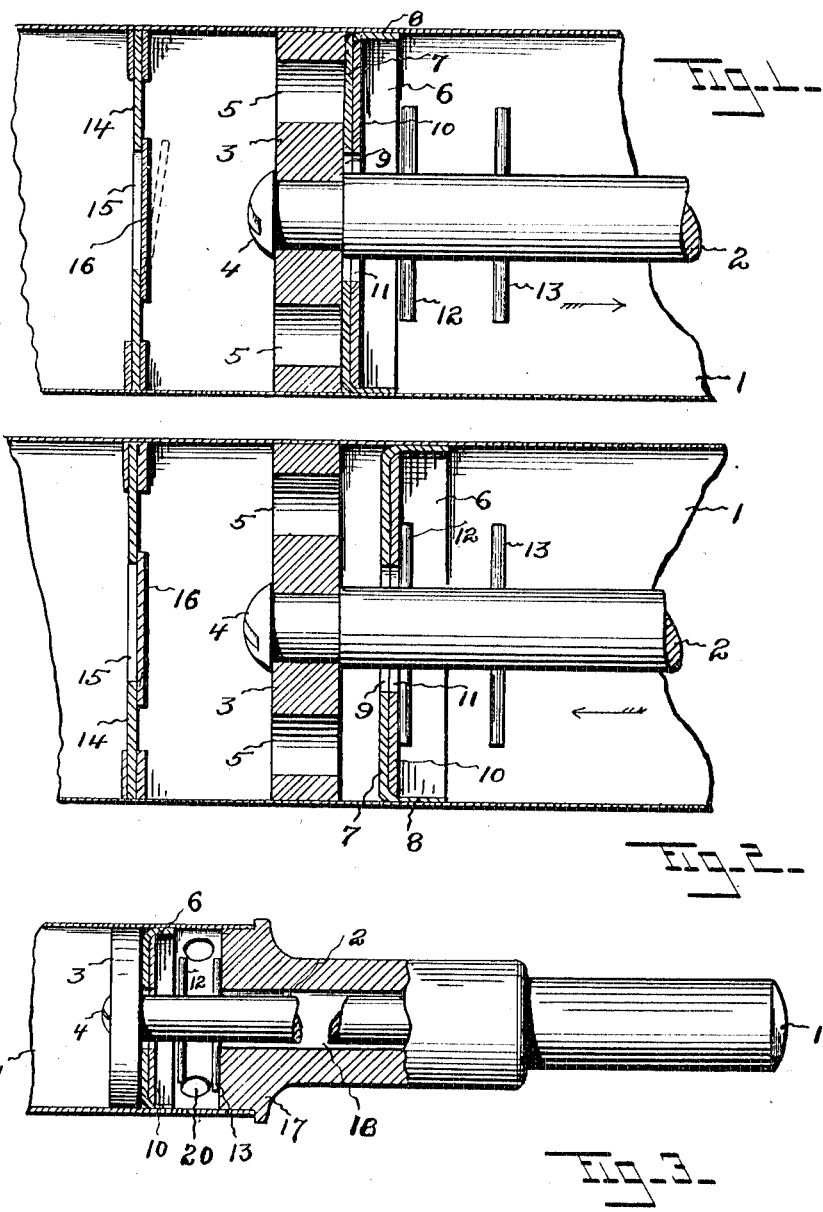

UNITED STATES PATENT OFFICE.

EDWIN A. REEVES, OF MILFORD, CONNECTICUT.

PISTON.

1,084,755.  Specification of Letters Patent.  Patented Jan. 20, 1914.

Application filed October 28, 1912. Serial No. 728,240.

*To all whom it may concern:*

Be it known that I, EDWIN A. REEVES, a citizen of the United States, residing at Milford, in the county of New Haven and State of Connecticut, have invented certain new and useful Improvements in Pistons, of which the following is a specification, reference being had therein to the accompanying drawings.

My invention relates to a new and improved piston of the type used in an air cylinder, and has for its object, among other things, the production of such a device that will permit of the most effective operation with the exercise of a minimum power.

To these, and other ends, my invention consists in the piston, having certain details of construction and combinations of parts, as will be hereinafter described and more particularly pointed out in the claims.

Referring to the drawings, in which like numerals of reference designate like parts in the several figures; Figure 1 is a sectional view of a cylinder and my improved piston, with the piston head in contact with the washer; Fig. 2 is a similar view with the piston head at a distance from the washer; and Fig. 3 is a fragmentary sectional view of one end of a cylinder with my improved mechanism therein.

My invention is especially designed for the cylinder of a vacuum cleaner, but it may be used with equal advantage in any similar device.

In vacuum cleaners, especially the hand type, it is necessary, for obvious reasons, that they be operated with the least possible exertion. The piston heretofore used has been constructed with a solid piston head and a washer fixed therewith, the flange thereof overhanging the edge of the piston head and bearing against the inside of the cylinder, so that these parts move as a unit. A clap valve is fixed to this type of piston head so as to permit the passage of air therethrough when the piston is being moved in one direction and closed against the passage of air when moving in the opposite direction. As the flange of the washer in this construction is not permitted to yield, owing to the rigid head upon the inside thereof, considerable pressure is required to operate the piston. Then again the cylinder of a vacuum cleaner is ordinarily made of welded tubing. In practice this is not always round, so that during its movement the piston head will bear unevenly at different points, that is, with considerable pressure at one point and none at another. If there is much irregularity in the shape of the cylinder there might even be an open space between the washer and the inside of the cylinder to interfere materially with the operation of the device. I have overcome these, and other objections, to this form of piston in my device, wherein the piston head is separate and distinct from the washer, which has no rigid part to effect the action of its flange and floats within the cylinder from one side to the other to accommodate irregularities in the interior thereof.

In the drawings the numeral 1 designates the cylinder, 2 the piston rod, and 3 the piston head, held thereon by the screw 4, said piston head having two port holes 5 therethrough, which are diametrically opposite each other. I prefer ordinarily to use two port holes, but the number thereof is not material, either more or less being used if desired.

The numeral 6 designates the flexible washer, preferably made of rubber, leather or similar material and constructed in the usual manner, having a head 7 and a flange 8. Through the head is an opening 9 of considerably larger diameter than that of the piston 2 for the passage of air therethrough, as well as to permit lateral movement if necessary within the cylinder. A disk 10 of smaller diameter than the said washer, and having an opening 11 corresponding in size with the opening 9, lies against the face of the head 7 so as to impart rigidity thereto. Fixed in said piston, and projecting upon each side thereof, are the pins 12 and 13, the former being a stop for the washer 6, and the latter forming a similar function for the piston rod 2. Either at the end of the cylinder or at a point within the interior thereof, is a disk 14, having an opening 15 therethrough, that is normally closed by a flexible clap valve 16 of the usual construction. The opposite end of the cylinder is preferably closed by a head 17, having a hole 18 therein for the piston rod 2 having a handle 19 upon its outer end.

In Fig. 1 the parts are shown in the relative positions occupied by them when the piston head 3 is being moved toward the cylinder head 17. During this movement air is drawn into the cylinder through the opening 15, the clap valve 16 occupying the position shown by broken lines, and one face of the piston head is against the washer head 7. The washer now effectually closes the port holes 5 and the piston head closes the opening 9, thus preventing the passage of air from one end of the cylinder to the other. Such air as is in front of the washer 6 escapes through the openings 20 in the end of the cylinder adjacent to the head 17. This intake movement is completed when the pin 13 contacts with the cylinder head 17, as shown in Fig. 3. In the reverse movement of the piston the head 3 moves away from the washer 6 until the pin 12 is brought into contact with the disk 10, at which time the washer and piston head move as a unit. During this latter movement the air in front of the piston 13 passes through the port holes 5, is deflected by the washer head 7 and passes through the openings 9 and 11. It is apparent that the washer flange 8 can yield to an unlimited degree, is not restrained in its yielding action, and can float laterally within the cylinder in relation to the piston.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is:—

1. A piston, including a piston rod, a head formed with port holes secured to said rod, a washer centrally formed with an opening of greater diameter than and encircling the rod, said opening forming the sole fluid passage through the washer, and means carried by the rod to limit the movement of the washer on the rod in one direction.

2. A piston including a piston rod, a head formed with port holes fixed on the rod, a washer centrally formed with an opening to receive the rod, said opening being of greater diameter than the rod and forming the sole fluid passage through the washer, and a pin carried by the rod beyond the washer with respect to the head, said pin limiting the movement of the washer on the rod in a direction away from the head.

In testimony whereof I affix my signature in presence of two witnesses.

EDWIN A. REEVES.

Witnesses:
SAMUEL A. GARDNER,
FLORENCE H. MONK.

---

Copies of this patent may be obtained for five cents each, by addressing the "Commissioner of Patents, Washington, D. C."